United States Patent [19]

Tokuda

[11] Patent Number: 5,432,586
[45] Date of Patent: Jul. 11, 1995

[54] PHOTOGRAPHIC PRINTING APPARATUS AND AUTOMATIC CUTTER

[75] Inventor: Kanji Tokuda, Kanagawa, Japan
[73] Assignee: Fuji Photo Film Co., Ltd., Kanagawa, Japan
[21] Appl. No.: 953,794
[22] Filed: Sep. 30, 1992
[30] Foreign Application Priority Data
Sep. 30, 1991 [JP] Japan .................. 3-250998
[51] Int. Cl.⁶ .............................................. G03B 29/00
[52] U.S. Cl. ................................. 355/41; 355/28; 355/50; 352/236; 250/548; 250/559.05
[58] Field of Search ................. 355/28, 29, 41, 50, 355/51; 352/236, 237; 353/25, 26 R, 26 A; 250/561, 559, 548, 571; 83/371

[56] References Cited

U.S. PATENT DOCUMENTS

| | | |
|---|---|---|
| 4,140,390 | 2/1979 | Schultheis et al. .................. 355/29 |
| 5,130,745 | 7/1992 | Cloutier et al. .................. 355/40 |
| 5,159,385 | 10/1992 | Imamura .................. 355/28 |

Primary Examiner—Michael L. Gellner
Assistant Examiner—D. P. Malley
Attorney, Agent, or Firm—Sughrue, Mion, Zinn, Macpeak & Seas

[57] ABSTRACT

A photographic printing apparatus in which images recorded on a photographic film are printed onto a photographic paper as printed images of print sizes of different aspect ratios and in which a printed photographic paper is conveyed distances corresponding to the print sizes and is cut. Indications symbolizing the print sizes are recorded at the photographic paper. The print sizes are identified by detection of the indications. Areas of the photographic paper in which the indications are detected based on identified print sizes are controlled. Mistakes in cutting can thereby be prevented.

17 Claims, 8 Drawing Sheets

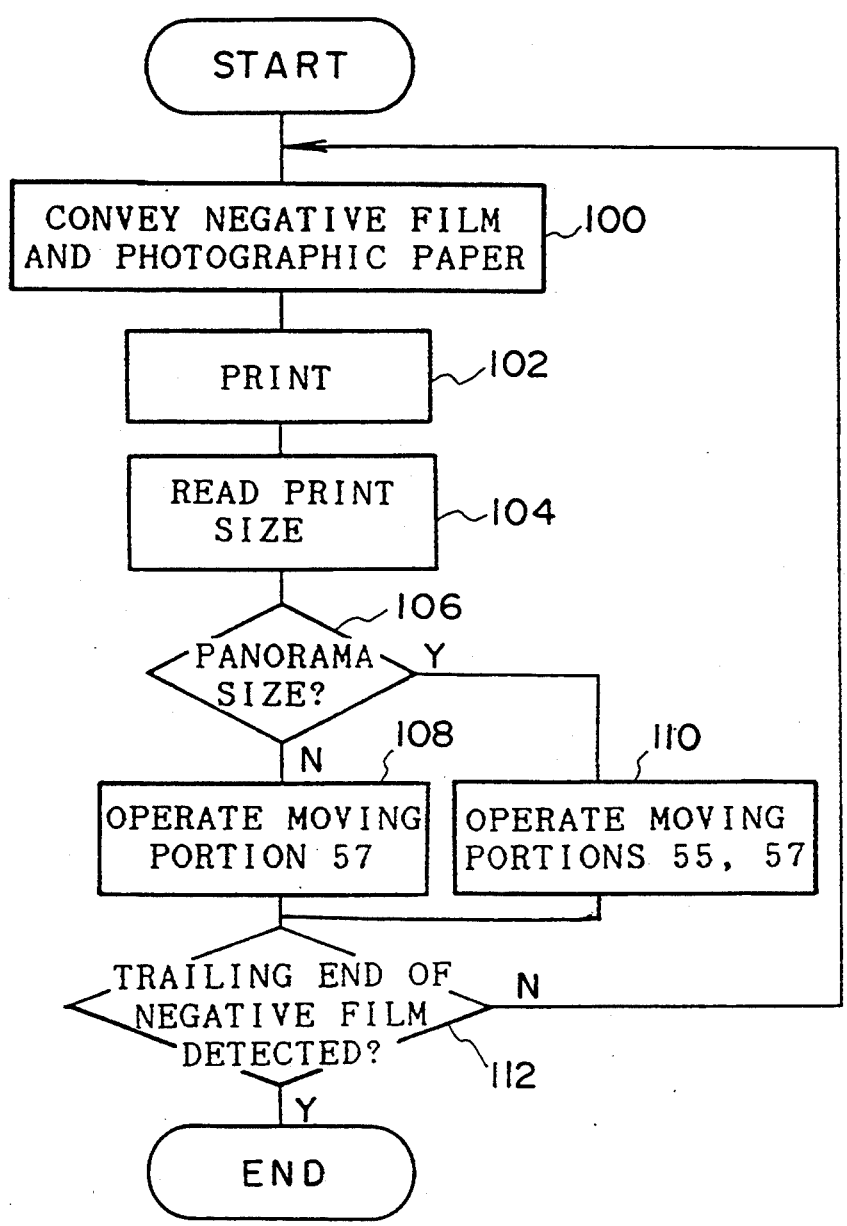

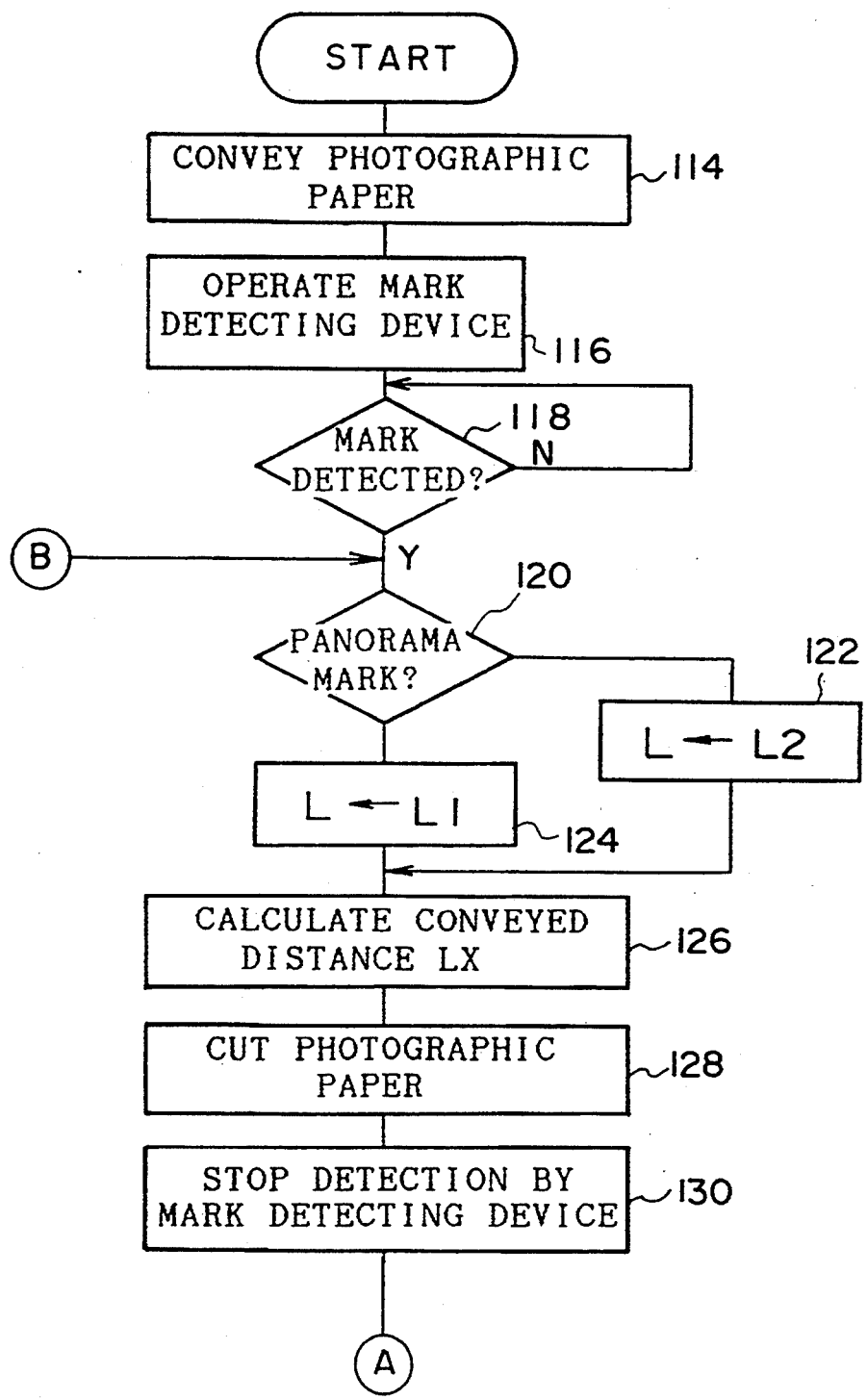

PHOTOGRAPHIC PRINTING APPARATUS AND AUTOMATIC CUTTER

BACKGROUND OF THE INVENTION

1. Field of the Invention

The present invention relates to a photographic printing apparatus and to an automatic cutter which cuts photographic paper printed by the photographic printing apparatus.

2. Description of the Related Art

When images recorded on a photographic film are printed on a photographic paper 200, illustrated in FIG. 7, in a photographic film apparatus, one type of circular hole 202 is provided in a margin portion 206 between an image frame 204 and another image frame 204. Accordingly, after all of the image frames have been printed on the photographic paper 200, the circular holes 202 are punched in the photographic paper 200 at intervals L3 along the longitudinal direction thereof.

When each image frame 204 is cut at an automatic cutter which cuts the roll of photographic paper 200 which has been printed and developed at the photographic printing apparatus, the circular hole 202 is detected by a detector. After the circular hole 202 is detected, the photographic paper 200 is conveyed a fixed distance. Thereafter, the photographic paper 200 is cut. However, in order to eliminate mistakes in cutting due to mistakes in the recording of the circular holes 202 and errors in the actions of the detector, the range over which the detector is effective is limited. Namely, when the circular hole 202 is detected, the detecting function of the detector is limited for an interval of time over which the photographic paper 200 is conveyed the fixed distance. In this way, errors in cutting due to noise or the like occurring when the printed frame, which is a space in which the circular holes 202 are not formed, is being transported can be eliminated from the start. Further, when the circular hole 202 is not detected in the time the photographic paper 200 is conveyed the fixed distance after the range in which the detection of the detector is limited and the detection function is resumed, operation is stopped due to abnormal detection, and an alarm is sounded. The fixed distances are set under the premise that the sizes of the image frames printed on a rolled paper are uniform.

However, it is not assumed that image frames 204, 210 of two types of print sizes having different aspect ratios, as illustrated in FIG. 8, are included on the same roll and are printed onto the photographic paper 200 at the above-described photographic printing apparatus. Regardless of the print size, a single type of the circular hole 202 is formed in the margin portions 206.

Namely, when the image frames 204, 210 having different print sizes are printed onto the same roll of the photographic paper 200 by the photographic printing apparatus, a single type of the circular hole 202 is formed at different intervals L3 and L4.

As a result, problems arise when the photographic paper 200 is conveyed in the direction of arrow A (to the right in FIG. 8) and is cut by the conventional automatic cutter based on the detection of the circular hole 202. Namely, after the rightmost circular hole 202 is detected, the circular hole 202 is not detected at a position 212 where it should be detected next. In this case, it is unclear if the circular hole 202 has not been detected due to either an error in the recording of the circular hole 202 or due to the image area of the image frame 210, whose length in the longitudinal direction of the photographic paper 200 is long, being a detected position and the position 212 being an image area. Accordingly, the photographic paper 200, on which image frames of different print sizes are included, cannot be cut into image frames of each print size.

SUMMARY OF THE INVENTION

In view of the aforementioned, a first object of the present invention is to provide a photographic printing apparatus able to record images, which are recorded on a photographic film, and indications, which correspond to print sizes of the images, onto a photographic paper.

Further, a second object of the present invention is to provide an automatic cutter which can cut a photographic paper, on which image frames of different print sizes are included, into image frames of each print size based on indications corresponding to the print sizes.

A first aspect of the present invention is a photographic printing apparatus which is able to print images recorded on a photographic film onto a photographic paper as printed images of print sizes of different aspect ratios. The photographic printing apparatus includes print size information reading means for reading print size information, indication recording means for recording at the photographic paper two or more types of indications respectively symbolizing the print sizes, and control means for identifying said print sizes based on the print size information read by the print size information reading means and for controlling the indication recording means so that the indication recording means records the indications symbolizing identified print sizes in vicinities of the printed images of the photographic paper.

A second aspect of the present invention is an automatic cutter which conveys a photographic paper, which is printed in accordance with the photographic printing apparatus of the first aspect, for distances corresponding to the print sizes, and cuts the photographic paper. The automatic cutter includes indication detecting means for detecting indications recorded on the photographic paper, print size identifying means for identifying, based on detected indications, the print sizes of images corresponding to the indications, and detection area controlling means for controlling operation of the indication detecting means in order to define, based on an identified print size, an area of the photographic paper in which the indication detecting means detects an indication which is at an upstream side in a direction of transport of the photographic paper and which is recorded next after the detected indications.

In the photographic printing apparatus related to the first aspect, when the images recorded on the photographic film are printed, the print size information is read by the print size information reading means. Based on this print size information, the print size is identified at the control means. Further, the control means controls the indication recording means to record indications, which correspond to the identified print sizes, at the photographic paper. As a result, the images and the indications corresponding to the sizes at which the images are printed are recorded on the photographic paper.

When a photographic paper printed by the photographic printing apparatus of the first aspect, e.g., a photographic paper on which normal prints and panorama prints are included, is cut, cutting is effected based on the indications recorded at the photographic paper. The photographic paper can thereby be reliably cut into normal prints and panorama prints.

The automatic cutter related to the second aspect identifies the print size of the image corresponding to the indication by the print size identifying means, based on the indication detected by the indication detecting means. The photographic paper is conveyed a distance corresponding to the identified print size and is cut. In this way, the photographic paper can be reliably cut into normal prints and panorama prints.

Further, based on the identified print size, the automatic cutter of the second aspect defines, by the detection area controlling means, an area in which an indication, which is next to a detected indication, is detected. By effecting detection of an indication in this defined detection area, the indication can be reliably detected even if there are prints of different sizes on the photographic paper. Moreover, the indications are detected only in the detection areas which are defined based on the identified print sizes. Therefore, reliability of detection improves.

Because of the above-described structures, the first aspect of the present invention provides a superior effect in that a photographic printing apparatus, which can print, onto a photographic paper, images recorded on a photographic film and indications corresponding to the images, can be obtained.

Moreover, the second aspect of the present invention has an outstanding effect in that an automatic cutter, which can cut a photographic paper including image frames of different print sizes into the respective image frames based on the indications corresponding to the print sizes, can be obtained.

BRIEF DESCRIPTION OF THE DRAWINGS

FIG. 5 is a flowchart illustrating a control program of the photographic printing apparatus.

FIGS. 6A and 6B are flowcharts illustrating a control program of an automatic cutter.

DESCRIPTION OF THE PREFERRED EMBODIMENTS

A photographic printing apparatus 10 relating to a first embodiment of the present invention will be described hereinafter with reference to FIGS. 1 through 8. Unillustrated paper masks, whose sizes correspond to sizes of images, are provided at the photographic printing apparatus 10. By properly using the paper masks so that they respectively correspond to the image sizes, a normal size image frame 44 and a panorama size image frame 46 (both illustrated in FIG. 4) can be printed. The length of the panorama size image frame 46 in the transverse direction (the direction of arrow B in FIG. 4) is the same is that of the normal size image frame 44, and the length of the panorama size image frame 46 in the longitudinal direction is twice that of the normal size image frame 44, can be printed.

Figure 1:
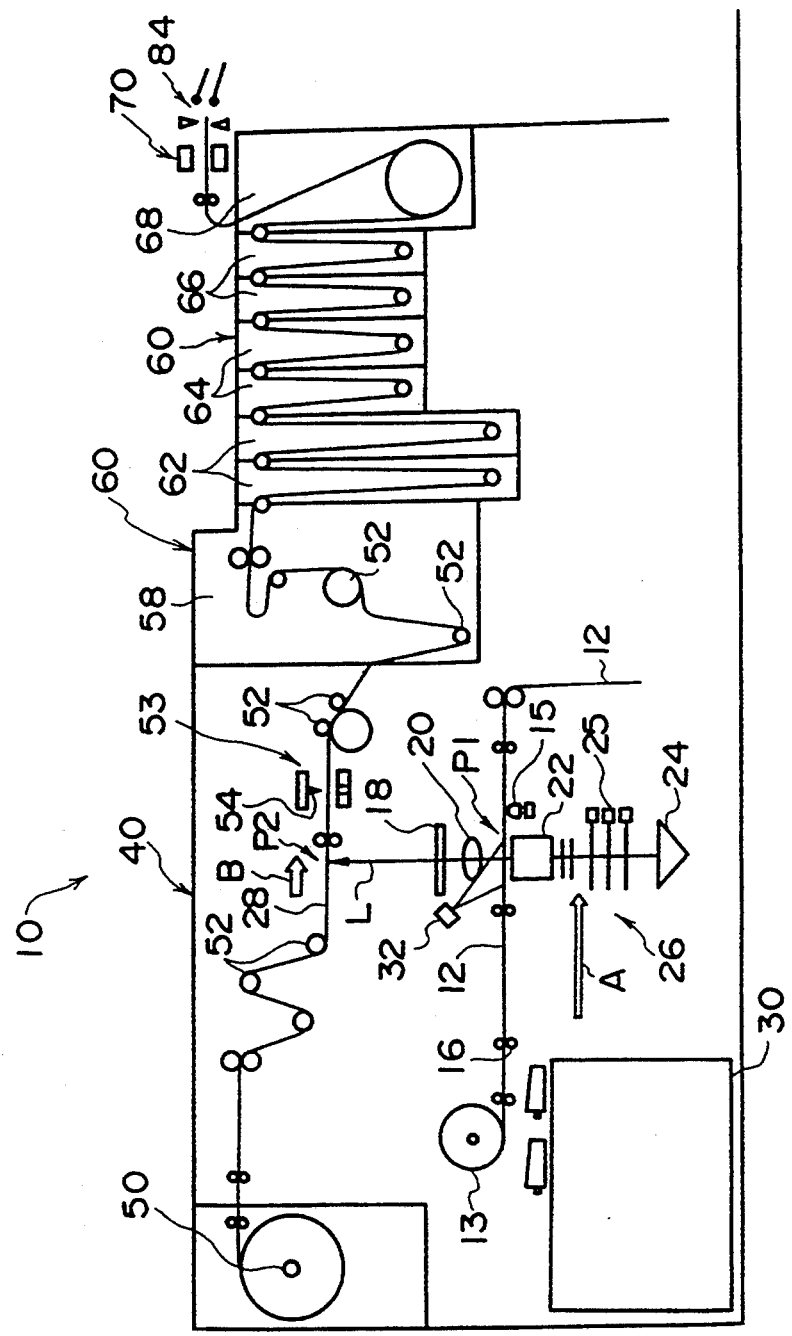
FIG. 1 is a schematic structural view of a photographic printing apparatus related to an embodiment of the present invention.
Figure 2:
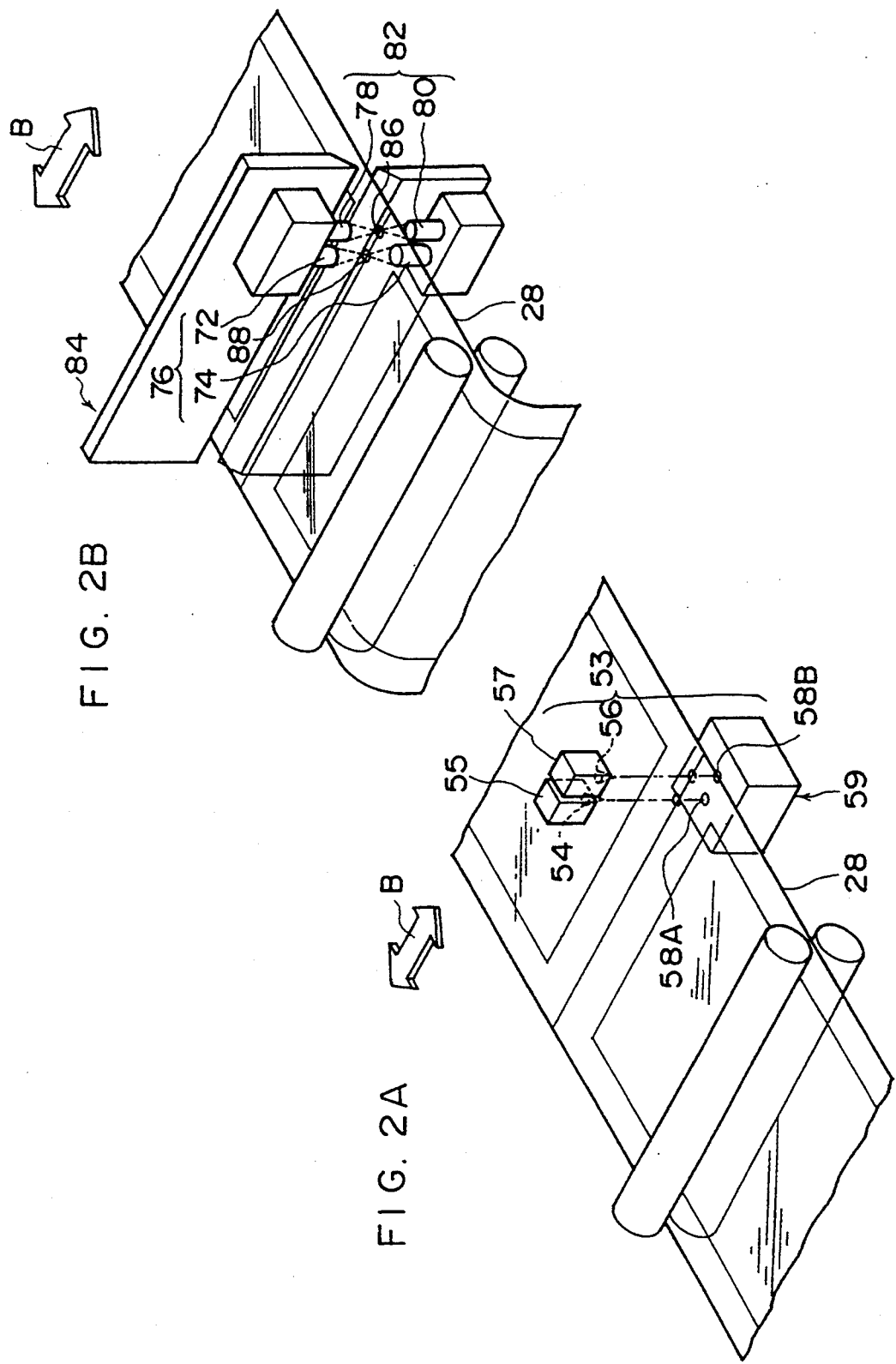
FIG. 2A is a perspective view illustrating a punching device of the photographic printing apparatus.
FIG. 2B is a perspective view illustrating sensors of the photographic printing apparatus.
Figure 3:
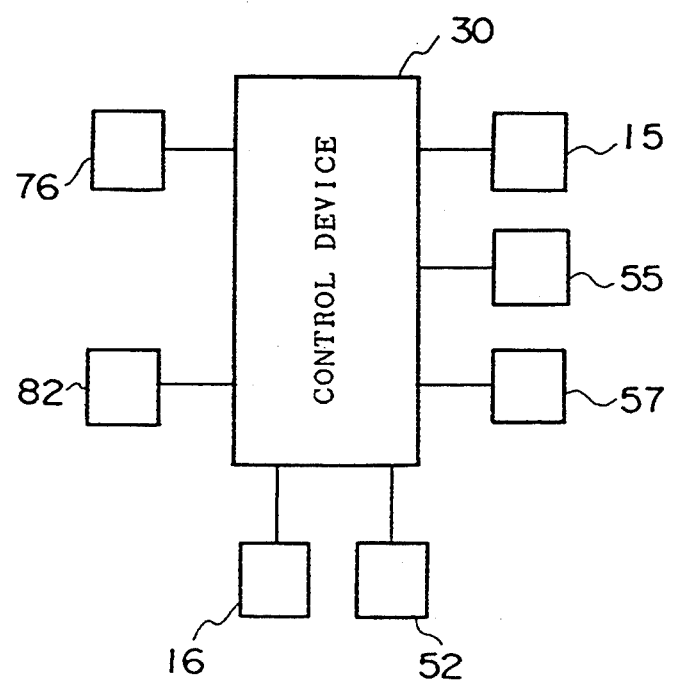
FIG. 3 is a block diagram illustrating a control means, and the sensors and the like controlled by the control means.

As shown in FIG. 1, a plurality of conveying rollers 16 is disposed in a printer portion 40 of the photographic printing apparatus 10 such that a negative film 12 can be interposed between and horizontally conveyed by the conveying rollers 16. The negative film 12 which is pulled out from a cartridge 13 is thereby conveyed to an image frame illumination position P1 of an exposure portion 26. As shown in FIG. 3, the conveying rollers 16 are connected to a control device 30. The driving/rotation of the conveying rollers 16 is controlled by the control device 30.

A mirror box 22 and a lamp house 24, which is equipped with a halogen lamp, are disposed beneath the image frame illumination position P1 of the exposure portion 26. A light-adjusting filter 25 is disposed between the mirror box 22 and the lamp house 24. As is well-known, the light-adjusting filter 25 is formed of three color filters: a Y (yellow) filter, an M (magenta) filter, and a C (cyan) filter.

A lens 20, a black shutter 18 and a photographic paper 28, on which the print position P2 is located, are disposed above the image frame illumination position P1 of the exposure portion 26 in that order from the image frame illumination position P1. Light, which is irradiated from the lamp house 24 and passes through the light-adjusting filter 25, the mirror box 22 and the negative film 12, forms an image by the lens 20 at the print position P2 on the photographic paper 28.

A two-dimensional image sensor 32, which divides a negative image frame into a plurality of sections and photometrically measures the sections, is disposed in a direction which is inclined with respect to an optical axis L of the above-described image-forming optical system and is disposed at a position at which photometric measurement of the image density of the negative film 12 is possible. The two-dimensional image sensor 32 is connected to the control device 30.

A magnetic head 15 is provided at a position downstream of the exposure portion 26 in the direction of transport of the negative film 12 (the direction indicated by arrow A). Print size information recorded in a vicinity of the image frame of the negative film 12 is read by the magnetic head 15. The print size information indicates whether a printed image is panorama size or normal size. As shown in FIG. 3, the magnetic head 15 is connected to the control device 30.

As illustrated in FIG. 1, a paper supply reel 50, in which the photographic paper 28 is loaded in the form of a roll, is disposed upstream of the print position P2 in the direction of transport of the photographic paper 28. A plurality of conveying rollers 52 are provided between the paper supply reel 50 and the print position P2 so as to convey the photographic paper 28 from the paper supply reel 50 to the print position P2 of the exposure portion 26. As shown in FIG. 3, the conveying rollers 52 are connected to the control device 30 so that the rotation of the conveying rollers 52 is controlled by the control device 30.

Figure 4:
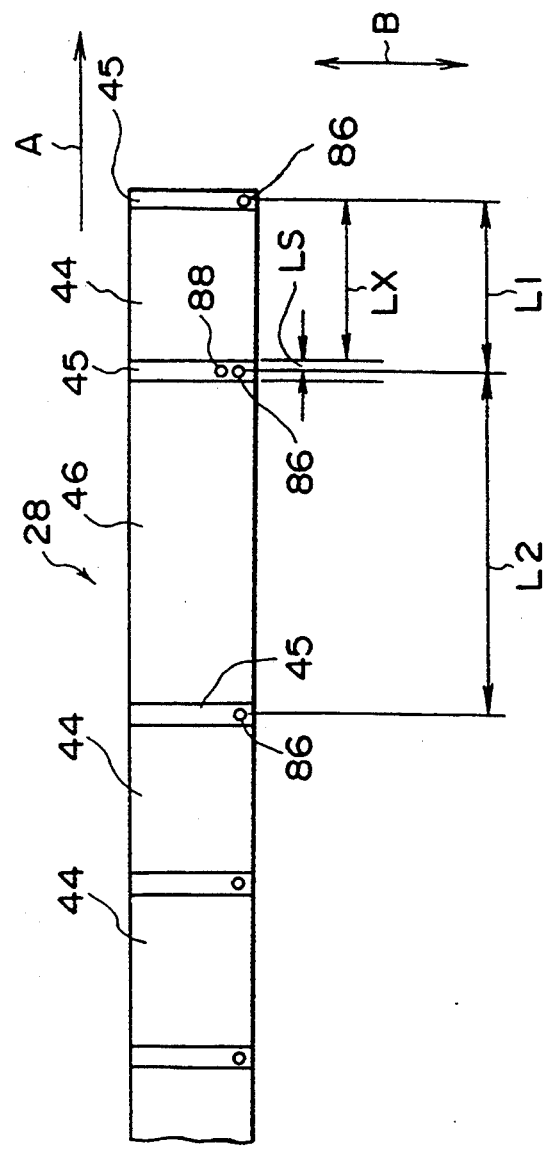
FIG. 4 is a plan view illustrating a photographic paper in which circular holes are formed.

A punching device 53, which serves as a mark recording means, is disposed downstream of the print position P2 in the direction of transport of the photographic paper 28. As shown in FIG. 2A, the punching device 53 is formed by a moving portion 55, which is equipped which a hole-opening pin 54, a moving portion 57, which is equipped with a hole-opening pin 56, and a fixed portion 59, which is equipped with insertion holes 58A, 58B into which the hole-opening pins 54, 56 are respectively inserted. The moving portions 55, 57 and the fixed portion 59 oppose each other such that the transport path of the negative film 12 is interposed between the moving portions 55, 57 and the fixed portion 59. The moving portions 55, 57 are controlled by the control device 30 so as to be able to reciprocally move between a position shown in FIG. 2A at which the moving portions 55, 57 are separated from the fixed portion 59, and a position at which the hole-opening pins 54, 56 are inserted into the respective insertion holes 58A, 58B. The moving portions 55, 57 are disposed so as to be spaced apart from each other in the transverse direction (the direction indicated by arrow B in FIG. 2A) of the photographic paper 28 which is being conveyed. Accordingly, as shown in FIG. 4, a single circular hole 86 (referred to hereinafter as a "normal mark") which indicates that the printed image frame 44 is normal size can be formed in a margin portion 45 between the image frames. Further, two circular holes (hereinafter referred to as a "panorama mark"), which show that the printed image frame is panorama size and which include the circular hole 86 and a circular hole 88, which is located more towards a central portion of the image frame in the transverse direction than the circular hole 86, can be formed in the margin portion 45 between the image frames.

Further, an unillustrated cutter is provided on the transport path of the negative film 12. When printing has been completed for an entire roll of negative film 12 supplied from one cartridge 13, the negative film 12 is cut by the cutter. The cut negative film 12 is rewound onto the cartridge by an unillustrated driving means.

A color developing tank 62, a bleaching/fixing tank 64, a rinsing tank 66 and a drying portion 68 are provided in a processor portion 60 of the photographic printing apparatus 10. The photographic paper 28 on which an image is printed is successively conveyed into each of the tanks by an unillustrated conveying mechanism whose operation is controlled by the control device 30. After the photographic paper 28 is processed by the processing liquids in the tanks, it is transported through the drying portion 68 and subsequently discharged.

A mark detecting device 70, which serves as a mark detecting means, is provided at a vicinity of the discharge opening of the drying portion 68. As illustrated in FIG. 2B, the mark detecting device 70 is formed by a sensor 76 and a sensor 82, which are disposed so as to be spaced apart from each other in the transverse direction (the direction of arrow B in FIG. 2B) of the photographic paper 28. The sensor 76 is formed by a light-emitting element 72, which is able to irradiate light to an area at which the circular hole 88 of the photographic paper 28 is formed, and a light-receiving element 74, which is able to detect the light irradiated from the light-emitting element 72. Further, the sensor 82 is formed by a light-emitting element 78, which is able to irradiate light to an area at which the circular hole 86 of the photographic paper 28 is formed, and a light-receiving element 80, which is able to detect the light irradiated from the light-emitting element 78. The sensors 76, 82 are connected to the control device 30 as shown in FIG. 3.

As illustrated in FIG. 1, a cutter 84 is provided downstream of the mark detecting device 70 in the direction of transport of the photographic paper 28. Each of the image frames of the photographic paper 28, which is transported from the drying portion 68, is cut at the margin portion 45 based on the normal marks and the panorama marks. The prints, which are the image frames cut by the cutter 84, are conveyed by an unillustrated conveying means and are accommodated in an unillustrated accommodating portion. The above-described control device 30, mark detecting device 70, cutter 84, and unillustrated conveying mechanism form an automatic cutter.

Further, an unillustrated sensor is provided on the transport path of the photographic paper 28 and is able to detect the upstream side end portion of the photographic paper 28 in the direction of transport thereof.

The control routine of the photographic printing apparatus 10 of the present embodiment will be described hereinafter with reference to the flowchart in FIG. 5.

When an image recorded on the negative film 12 is to be printed onto the photographic paper 28, in step 100, the conveying rollers 52 and the conveying rollers 16 are driven to rotate. The negative film 12 and the printing paper 28 are conveyed to the image frame illumination position P1 and the print position P2, respectively. In step 102, the image of the negative film 12 positioned at the image frame illumination position P1 is printed onto the photographic paper 28.

In step 104, the print size information magnetically recorded in a vicinity of the image is read by the magnetic head 15. In step 106, a determination is made, based on the read print size information, whether the printed image is panorama size or normal size. If a determination is made that the printed image is panorama size, in step 110, the moving portions 55, 57 are moved toward the fixed portion 59, and the hole-opening pins 54, 56 are inserted in the respective insertion holes 58A, 58B so as to form a panorama mark. The panorama mark is recorded in the margin portion 45 at the downstream side of the image in the direction of transport of the photographic paper 28.

If a determination is made that the printed image is normal size, the routine moves to step 108 where the moving portion 57 is operated. In this way, the normal mark, which is formed by the hole-opening pin 56 being inserted into the insertion hole 58B, is recorded in the margin portion 45 at the downstream side of the printed image in the direction of transport of the photographic paper 28. The above-mentioned steps are repeated until the trailing end of the negative film 12 is detected in step 112. When the trailing end of the negative film 12 is detected, the process is completed.

Figure 6B:
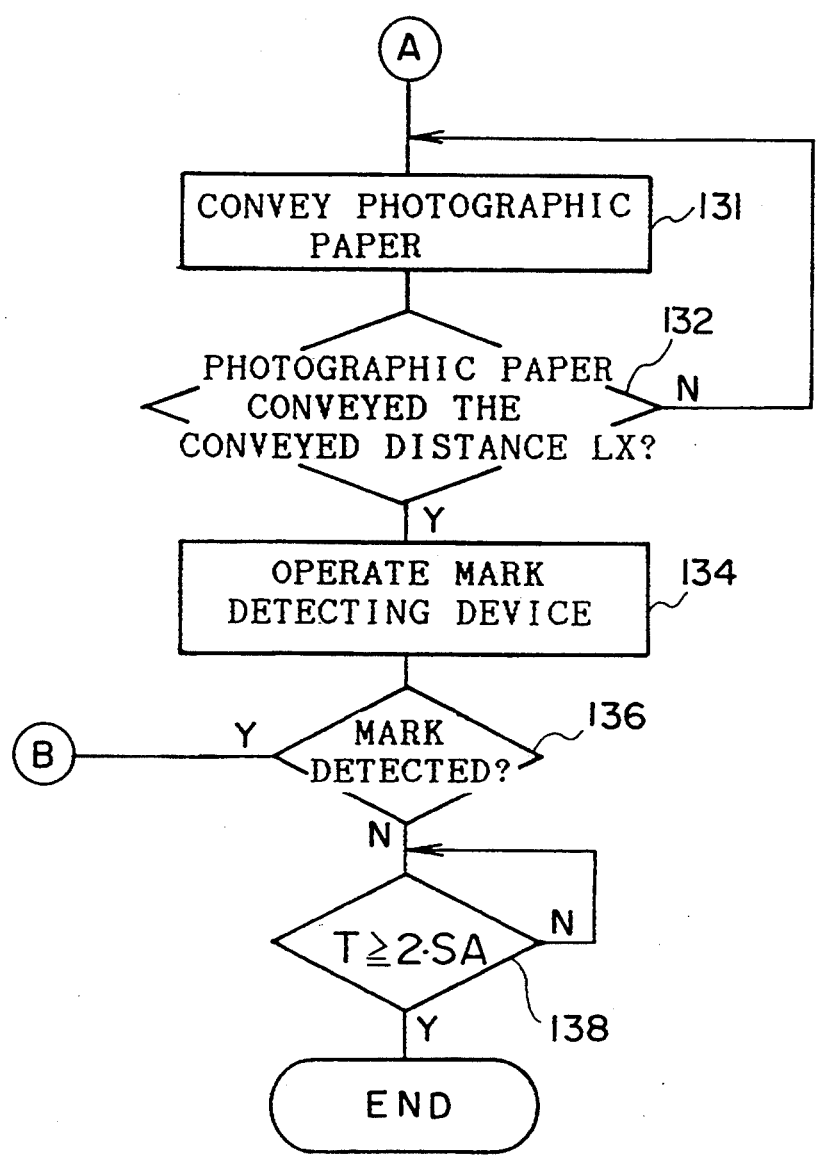
Figure 7:
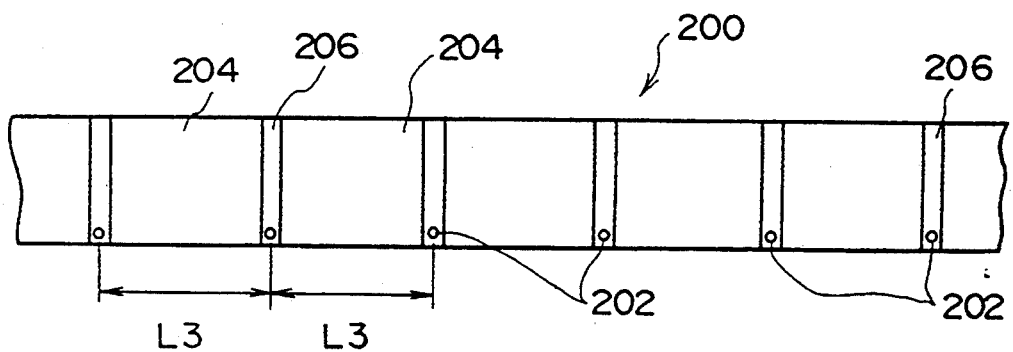
FIG. 7 is a plan view illustrating a conventional photographic paper on which image frames and marks corresponding to the image frames are recorded.
Figure 8:
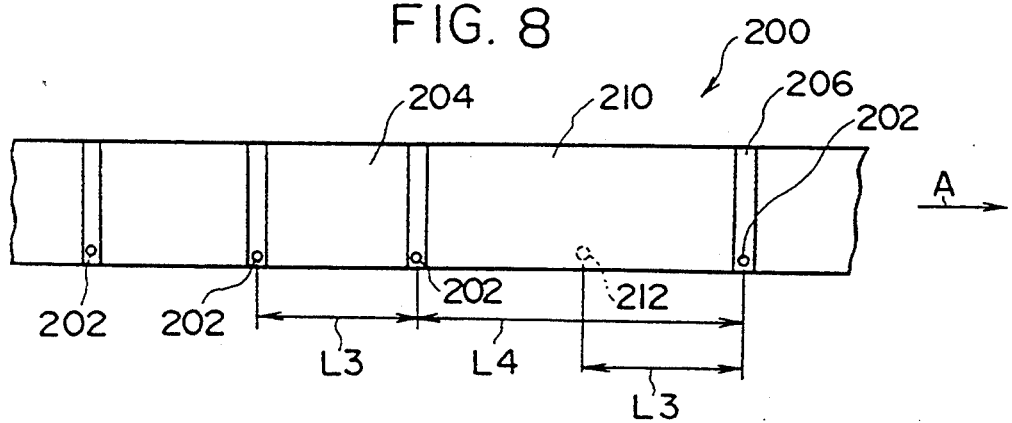
FIG. 8 is a plan view illustrating a conventional photographic paper on which image frames of different print sizes and marks corresponding to the image frames are recorded.

Next, the control routine of the automatic cutter will be described with reference to the flowcharts in FIGS. 6A and 6B. In step 114, the photographic paper 28 is conveyed by the unillustrated conveying means, is processed successively by the processing liquids in the color developing tank 62, the bleaching/fixing tank 64 and the rinsing tank 66, and is dried in the drying portion 68. In step 116, voltage is applied to the light-emitting elements 72, 78 of the mark detecting device 70 so that the mark detecting device 70 is in a state in which it detects the marks.

In step 118, a determination is made as to whether a panorama mark or a normal mark has been detected by the mark detection device 70. If it is determined that either has been detected, the routine proceeds to step 120 where it is determined whether the mark is a panorama mark or a normal mark. On the other hand, if it is determined that neither a panorama mark nor a normal mark has been detected, step 118 is repeated.

When the photographic paper 28 shown in FIG. 4 is conveyed in the direction indicated by arrow A in FIG. 4, first, the normal mark recorded on the rightmost margin portion 45 is detected. In step 124, a value L used to calculate a conveyed distance LX which the photographic paper 28 is conveyed is set to L1, In step 126, the conveyed distance LX is calculated based on the set value L1.

If a panorama mark recorded on the margin portion 45 next to the above-mentioned margin portion 45 is detected in step 120, in step 122, the value L used to calculate the conveyed distance LX of the photographic paper 28 is set to L2. In step 126, the conveyed distance LX is calculated based on the set value L2.

As shown in FIG. 4, L1 indicates the distance from the circular hole 86 formed in the margin portion 45 to the circular hole 86 formed in the next marking portion 45. L2 indicates the distance from the circular hole 86 formed in the margin portion 45 to the circular hole 86 formed in the margin portion 44 which is upstream in the direction of transport of the photographic paper 28. Further, LS is one half of the length of the margin portion 45 in the longitudinal direction of the photographic paper 28.

As described above, the conveyed distance LX is calculated in step 126 based on the mark identified in step 120. Thereafter, in step 128, the photographic paper 28 is cut at a vicinity of the identified mark of the margin portion 45. In the present embodiment, normal marks are recorded so as to correspond to normal size image frames 44, and panorama marks are recorded so as to correspond to panorama size image frames 46. The photographic paper 28 is conveyed a distance based on these marks and is cut. Therefore, even if there are both the normal size image frames 44 and the panorama size image frames 46 on the photographic paper 28, the photographic paper 28 is cut such that the normal size image frames 44 and the panorama size image frames 46 can be cut accurately.

In step 130, the voltage applied to the light-emitting elements 72, 78 of the mark detecting device 70 is cut, and the mark detecting device 70 is in a state in which it does not detect the marks. In step 131, the photographic paper 28 is conveyed. In step 132, a determination is made as to whether the photographic paper 28 has been transported the conveyed distance LX, i.e., whether the position of the photographic paper 28 which should be cut has reached the cutter 84. When it is determined that the photographic paper 28 has already been conveyed the conveyed distance LX, in step 134, voltage is applied to the light-emitting elements 72, 78 such that the mark detecting device 70 is in a state in which it detects the marks. In the present embodiment, while the photographic paper 28 is being conveyed the conveyed distance LX, the detection of the marks by the mark detecting device 70 is stopped. Namely, because detection of the marks is effected only at the margin portions 45, the reliability of detecting the marks improves.

If it is determined in step 132 that the photographic paper 28 has not been transported the conveyed distance LX, step 132 is repeated until the photographic paper has been conveyed the conveyed distance LX. In step 136, it is determined whether a normal mark or a panorama mark has been detected by the mark detecting device 70. If it is determined that either mark has been detected, the routine returns to step 120, and the above-mentioned operations are repeated so that the conveyed distance LX of the photographic paper 28 is calculated, the photographic paper 28 is cut, and the like. If it is determined in step that neither mark has been detected, a determination is made in step 138 as to whether the photographic paper 28 has been transported a distance greater than or equal to (2×SA), i.e., whether a mark is recorded in the margin portion 45. If the conveyed distance of the photographic paper 28 does not exceed (2×SA), step 138 is repeated, and mark detection is effected. When it is determined that the conveyed distance is greater than or equal to (2×SA), either the printing of the photographic paper 28 has been completed or there has been a mark recording error, and therefore, the process is completed. When there is a mark recording error, an alarm is sounded, and the conveying of the photographic paper 28 is stopped.

In the present embodiment, after the photographic paper 28 is cut by the automatic cutter, the cut photographic paper 28 is accommodated in the accommodating portion without being sorted by print size. However, a sorter may be provided so that the normal size prints and the panorama size prints are sorted and placed in the accommodating portion. By sorting the prints according to print size in this way, calculation of the cost of the prints is facilitated, and the fee slip can be issued quickly.

Further, the present embodiment is described using a case in which panorama size and normal size prints are included on the photographic paper 28. However, the present embodiment can also be applied to a case in which prints of various sizes are included on the same photographic paper 28. For example, the present embodiment can be used with 3R and 3S images on 89-width photographic paper or with 3R and 5R images on 127-width photographic paper or the like.

What is claimed is:

1. A photographic printing apparatus able to print images recorded on a photographic film onto a photographic paper as printed images of print sizes of different aspect ratios, comprising:
   print size information reading means for reading print size information from said photographic film;
   indication recording means for recording at said photographic paper two or more types of indications respectively symbolizing said print sizes; and
   control means for identifying said print sizes based on said print size information read by said print size information reading means and for controlling said indication recording means so that said indication recording means records said indications symbolizing identified print sizes in vicinities of said printed images of said photographic paper and so that more than one size of printed frame can be printed from one of said photographic films.

2. A photographic printing apparatus according to claim 1, wherein said indications are marks and said indication recording means is a mark recording device.

3. A photographic printing apparatus according to claim 1, wherein said indication recording means records said indications between image frames of said photographic paper.

4. A photographic printing apparatus according to claim 1, wherein said print size information is recorded on said photographic film and said print size information reading means is a magnetic device which reads said print size information from said photographic film.

5. An automatic cutter which conveys a photographic paper, on which images recorded on a photographic film are recorded as printed images of print sizes of different aspect ratios and on which indications symbolizing said print sizes are recorded, for distances corresponding to said print sizes, and cuts said photographic paper, comprising:
  indication detecting means for detecting said indications recorded on said photographic paper;
  print size identifying means for identifying, based on detected indications, said print sizes of images corresponding to said indications;
  detection area controlling means for controlling operation of said indication detecting means in order to define, based on an identified print size derived from said detected indications, an area of said photographic paper in which said indication detecting means detects an indication which is at an upstream side in a direction of transport of said photographic paper and which is recorded next after said detected indications.

6. An automatic cutter according to claim 5, wherein said detection area controlling means controls the operation of said indication detecting means so that said indication detecting means does not effect detection of said indications in areas other than the area of said photographic paper defined based on said identified print size.

7. An automatic cutter according to claim 5, wherein the area of said photographic paper is defined based on a length of the area of said photographic paper in the direction of transport of said photographic paper.

8. An automatic cutter according to claim 7, further comprising:
  means for turning off said indication detection means after said indication detection means detects a first indication;
  means for calculating a first length based upon said first indication detected by said indication detection means;
  means for turning on said indication detection means after said photographic paper is conveyed a distance equal to said first length;
  means for cutting said photographic paper after said photographic paper is conveyed a distance equal to a second length, the conveying of said photographic paper said distance equal to said second length being ascertained by said indication detection means detecting a second indication, and said second length corresponding to an identified print size.

9. An automatic cutter according to claim 5, further comprising:
  warning means for warning when said indications are not detected even if said indication detecting means is effecting detection of the area of said photographic paper defined based on said identified print size.

10. A photographic printing apparatus in which images recorded on a photographic film are printed onto a photographic paper as printed images of print sizes of different aspect ratios and in which a printed photographic paper is conveyed distances in accordance with said print sizes and is cut, comprising:
  print size information reading means for reading print size information from said photographic film so that print size information relating to more than one print size can be read from a same roll of photographic film;
  indication recording means for recording at said photographic paper two or more types of indications respectively symbolizing said print sizes;
  control means for controlling said incitation recording means so that said print sizes are identified based on said print size information read by said print size information reading means and so that said indications symbolizing identified print sizes are recorded in vicinities of said printed images of said photographic paper;
  indication detecting means for detecting said indications recorded on said photographic paper;
  print size identifying means for identifying, based on detected indications, said print sizes of images corresponding to said indications;
  detection area controlling means for controlling operation of said indication detecting means in order to define, based on an identified print size, derived from said detecting of said indications, an area of said photographic paper in which said indication detecting means detects an indication, which is at an upstream side in a direction of transport of said photographic paper and which is recorded next after said detected indications.

11. A photographic printing apparatus according to claim 10, wherein said indications are marks and said indication recording means is a mark recording device.

12. A photographic printing apparatus according to claim 10, wherein said indication recording means records said indications between image frames of said photographic paper.

13. A photographic printing apparatus according to claim 10, wherein said print size information reading means is a magnetic device which reads said print size information from said photographic film.

14. A photographic printing apparatus according to claim 10, wherein said detection area controlling means controls the operation of said indication detecting means so that said indication detecting means does not effect detection of said indications in areas other than the area of said photographic paper defined based on said identified print size.

15. A photographic printing apparatus according to claim 10, wherein the area of said photographic paper is defined based on a length of the area of said photographic paper in the direction of transport of said photographic paper.

16. A photographic printing apparatus according to claim 15, further comprising:
  means for turning off said indication detection means after said indication detection means detects a first indication;
  means for calculating a first length based upon said first indication detected by said indication detection means;

means for turning on said indication detection means after said photographic paper is conveyed a distance equal to said first length;

means for cutting said photographic paper after said photographic paper is conveyed a distance equal to a second length, the conveying of said photographic paper said distance equal to said second length being ascertained by said indication detection means detecting a second indication, and said second length corresponding to an identified print size.

17. A photographic printing apparatus according to claim 10, further comprising:

warning means for warning when said indications are not detected even if said indication detecting means is effecting detection of the area of said photographic paper defined based on said identified print size.

* * * * *